US008862613B2

(12) United States Patent
Stein et al.

(10) Patent No.: US 8,862,613 B2
(45) Date of Patent: Oct. 14, 2014

(54) EXTENSIBILITY OF BUSINESS PROCESS AND APPLICATION LOGIC

(75) Inventors: Tobias Stein, Heidelberg (DE); Klaus Nottbohm, Hockenheim (DE); Frank Mock, Diedorf (DE); Stefan Kusterer, Malsch (DE); Ralf Dentzer, Hockenheim (DE); Karsten Bohlmann, Rauenberg (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/554,818

(22) Filed: Jul. 20, 2012

(65) Prior Publication Data
US 2013/0024472 A1      Jan. 24, 2013

Related U.S. Application Data

(63) Continuation-in-part of application No. 12/847,142, filed on Jul. 30, 2010.

(30) Foreign Application Priority Data

Jul. 21, 2011  (EP) ..................................... 11174778

(51) Int. Cl.
*G06F 7/00* (2006.01)

(52) U.S. Cl.
USPC ........................................................ 707/769

(58) Field of Classification Search
USPC ................... 707/999.101, 999.102, 683, 769
See application file for complete search history.

(56) References Cited

U.S. PATENT DOCUMENTS

| 5,241,668 | A | 8/1993 | Eastridge et al. |
| 6,249,807 | B1 * | 6/2001 | Shaw et al. ................... 709/206 |
| 6,317,872 | B1 * | 11/2001 | Gee et al. ...................... 717/152 |
| 6,941,304 | B2 * | 9/2005 | Gainey et al. .......................... 1/1 |
| 7,007,005 | B2 * | 2/2006 | Rautenback et al. .................. 1/1 |
| 7,636,742 | B1 | 12/2009 | Olavarrieta et al. |
| 8,645,958 | B2 * | 2/2014 | Huetter et al. ................ 718/101 |
| 2002/0099681 | A1 * | 7/2002 | Gainey et al. ..................... 707/1 |
| 2005/0235000 | A1 * | 10/2005 | Keil .............................. 707/200 |
| 2009/0161860 | A1 * | 6/2009 | Patadia et al. ................. 379/418 |
| 2010/0153696 | A1 | 6/2010 | Beachem et al. |
| 2011/0093484 | A1 * | 4/2011 | Bando et al. .................. 707/758 |
| 2012/0324449 | A1 * | 12/2012 | Huetter et al. .................... 718/1 |

* cited by examiner

*Primary Examiner* — Syling Yen
*Assistant Examiner* — Eliyah S Harper
(74) *Attorney, Agent, or Firm* — Kenyon & Kenyon LLP

(57) ABSTRACT

A core system including different program components performing distinct tasks in a workflow sequence that are initiated through status field updates of objects in database may be modified to define a new status triggering additional processes in an action management system. Once the additional processes are completed, the status field may be changed to an original status provided by the core system to trigger a second program component in the workflow sequence. The action management system may contain user customized processes that may be modified and changed independent of the functionality provided by the core system.

20 Claims, 11 Drawing Sheets

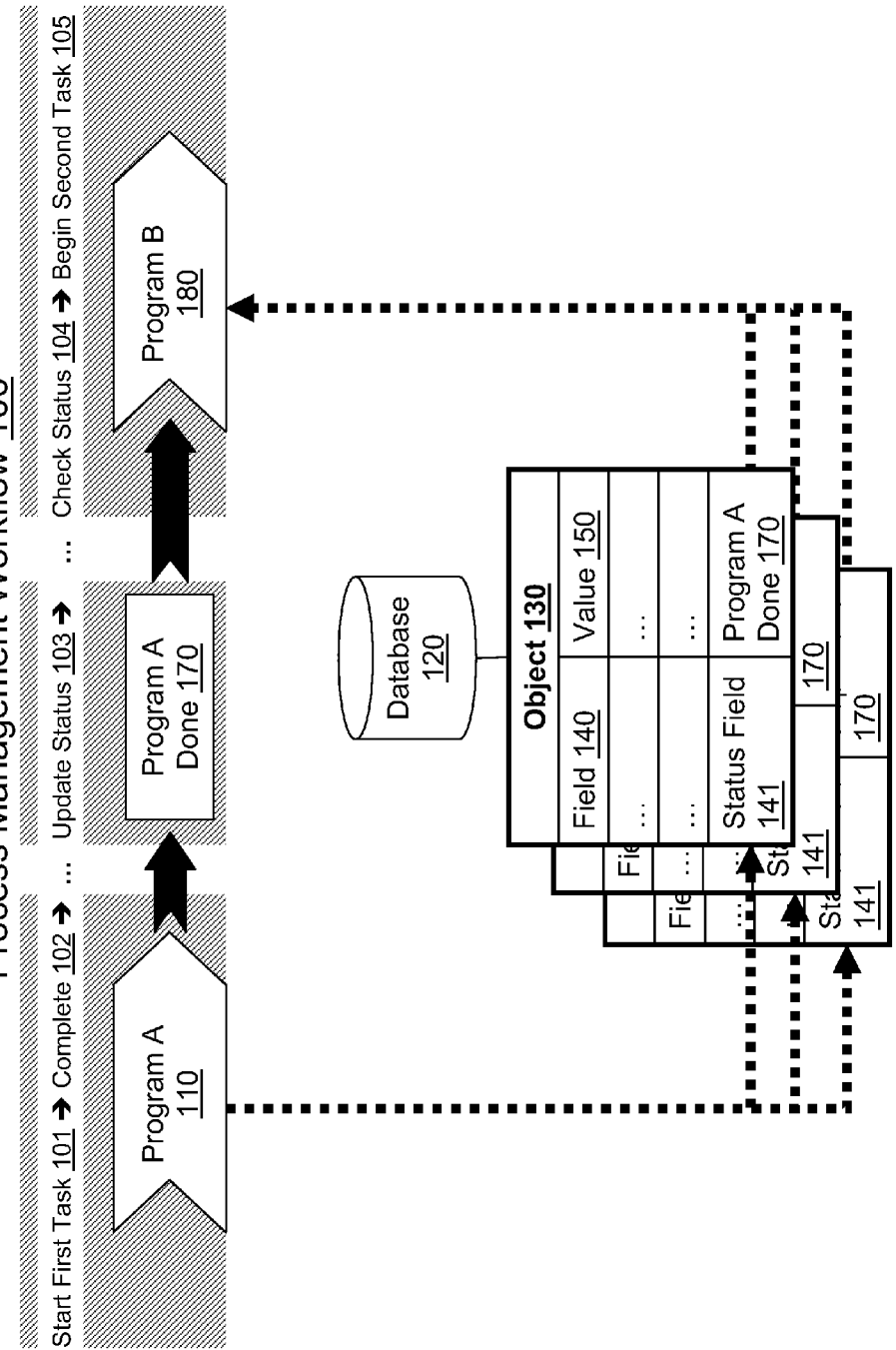

EXTENSIBILITY OF BUSINESS PROCESS AND APPLICATION LOGIC

CROSS-REFERENCE TO RELATED APPLICATIONS

This application is a continuation-in-part of U.S. patent application Ser. No. 12/847,142 filed Jul. 30, 2010 (pending), and also claims priority to European Patent Application No. 11174778.8 filed Jul. 21, 2011; the contents of both applications are incorporated herein by reference.

BACKGROUND

Organizations use enterprise resource planning (ERP), customer relationship management (CRM), and other business management systems to manage business processes and workflows. These systems may include various subcomponents to manage different tasks in a workflow. For example, an order management system may generate an order form, supply the form to a prospective purchaser, and process the completed form submitted by the purchaser. A delivery management system may instruct an entity to initiate delivery of the ordered items in the completed order form and track the status of the order items throughout the delivery process.

Each of these subcomponents may be wholly independent from each other, in that the subcomponents may not directly communicate with each other. Thus, in the above example, the order management system may not directly communicate with the delivery management system. Although these subcomponents may not directly communicate, a business workflow may still require tasks and functions to be completed in a specific order. For example, an order form may have to be completed and processed before goods may be delivered.

To preserve order and continuity in the workflow, each of the subcomponents may update a status field of a object in a database. Once a subcomponent has completed its assigned tasks on an object, the subcomponent may update the status field for the object in the database accordingly. A second subcomponent in the workflow may be configured to check the status field of objects in the database and begin processing objects with a status field indicating that the prior subcomponent in the workflow has been completed. This ensures that the second subcomponent is not processed out of sequence.

SUMMARY

Computer implemented methods, computer systems, and computer readable media may be used in different embodiments to execute computational tasks in a highly flexible and adaptable manner that facilitates a loose coupling between components as claimed in the independent claims.

A 'state machine' as understood herein is a computer program or program component being executed by one or more microprocessors that includes a finite number of states, a number of transitions between those states, and a number of actions that may be performed when certain conditions are met. The state machine has an internal memory and an input for receiving a signal, such as a request.

The term 'loose coupling' as understood herein is a form of coupling between program components that enables asynchronous sequential execution of the program components for implementation of a service oriented architecture. In other words, a completed execution of a first program component does not directly start execution of a second program component but the start of the execution of the second program component is triggered otherwise by merely using the completion of the first program component as a necessary condition.

The term 'web service' as understood herein refers to a web services architecture as specified by the W3C working group.

The term 'web services push message' as understood herein refers to a push service implemented by a web service.

Some embodiments may include flexibility to optionally execute or not execute an extension of the computational task performed by a first program component. This flexibility may be accomplished without having to reconfigure the core system and with minimal modifications and delay of the core system.

The flexibility may be provided by using a state machine to loosely coupling the first program component performing the computational task and the second program component that performs a consecutive further computational task through a database in which a status and a precursor of the status that precedes the status are stored. This allows a standardized computer system to be delivered to a customer as the standardized systems may be later adapted to the customer's needs by adding the extension of the computational task performed by the first program component with minimal adaptations to the core system while providing loose coupling between the first and the second program components.

In some instances a data processing system may be provided that includes multiple computer systems arranged in a cascade. This may enable distributed data processing using a service oriented architecture for maximum flexibility, load distribution and avoidance of a single point of failure.

Embodiments of the invention may include user-specific process modifications of existing process management systems that are independent of system upgrades and integrations.

BRIEF DESCRIPTION OF THE DRAWINGS

FIG. 1a is shows an existing process management workflow.

DETAILED DESCRIPTION

Figure 1B:
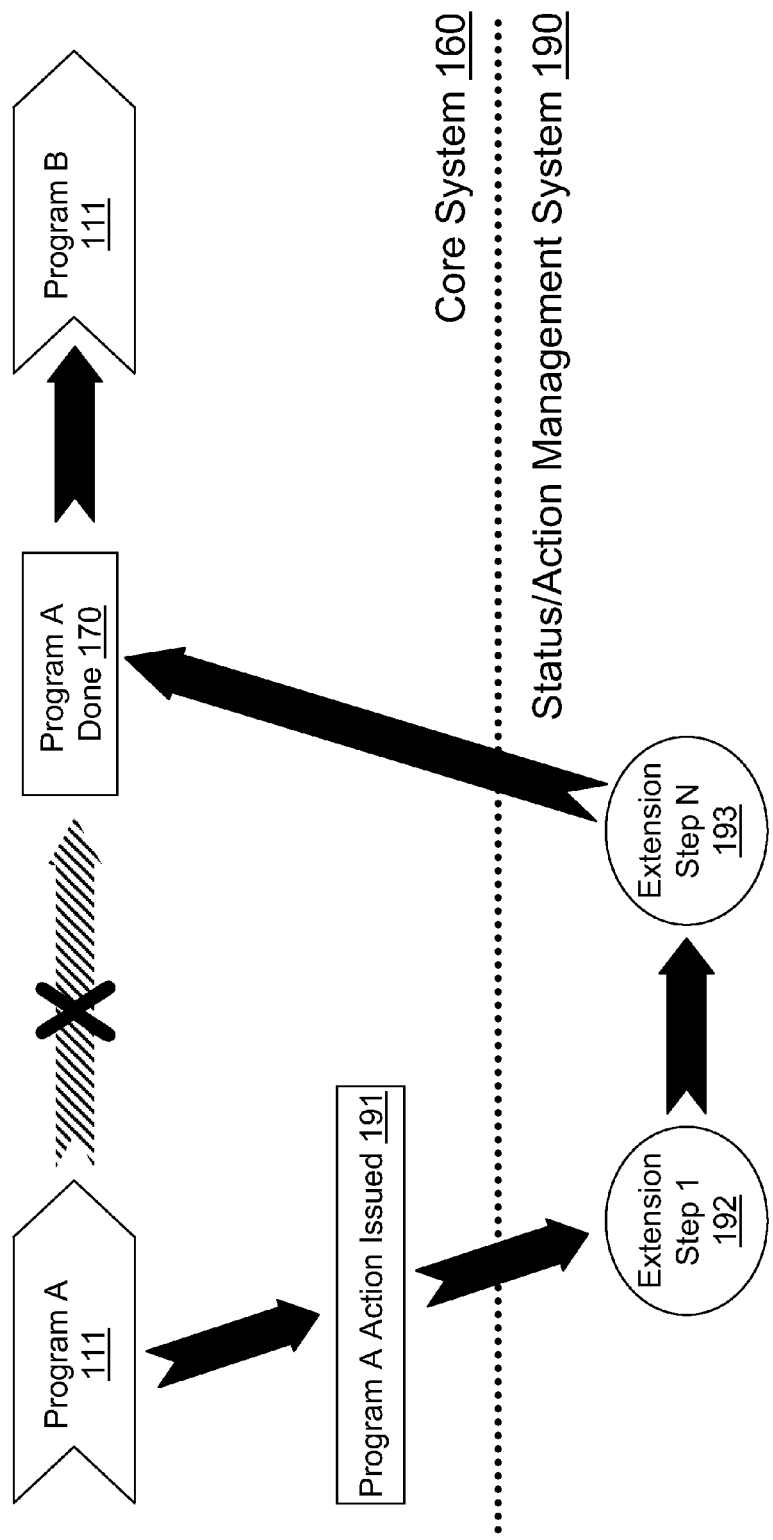
FIG. 1b shows an exemplary embodiment of the invention.

FIG. 1a is shows a process management workflow 100. In this workflow, a first program A 110 may be designed to perform a sequence of tasks, such as initiating a first task 101 in response to a stimulus, performing the first task 102 on an object, and then updating the status in a status field 141 of the object. The status field 141 of the object may be updated to indicate whether the first task was successfully completed 170.

Program A 110 may be independent of the second program, program B 180, which may be designed to perform a sequence of other tasks, such as checking the status field 141 of objects, and initiating and completing a second task 105 when the status field 141 indicates that program A 110 was successfully completed. This may ensure that program B 180 is not completed before program A 110 and that the processing order of tasks in the workflow is maintained even though the programs A 110 and B 180 do not directly communicate.

Many existing business process management systems include the functionality shown in FIG. 1a. However, some users of these existing systems may have additional workflow processes that they would like to perform that are not included in the generic system. For example, users in some countries may have additional locality-specific compliance checks that need to be performed between different tasks and programs in the system. Other users may have specific processes unique to their organization that they would like to perform.

Users wanting to include additional user-specific processes have had to modify the existing systems to include the additional functionality. However, these user-specific modifications have also caused complications when upgrading business management systems or when integrating other systems with the business management systems. Complications may occur because the upgrading and/or integration process may either overwrite the user-specific modifications or may result in an incompatibility between the functionality offered in the new systems with the modifications previously made to the existing system.

A core system may include different program components to perform tasks in a workflow sequence according to a status of an object recorded in a database status field. In an embodiment of the invention, the recorded status of a task may be modified from a completed status to a partially completed status when the task in the core system is successfully completed. An action management system may be used to perform additional processes and tasks on objects with the partial completion status. Once the additional processes and tasks are completed, the recorded status may be further modified to the original completed status so that other program components in the core system depending on the original completed status may continue to operate.

FIG. 1b shows an exemplary embodiment of the invention. In this embodiment, a core system 160 may include different program components 111, such as programs A and B that perform different tasks in a workflow. Each of the programs A and B 111 may be independent of each other in that the programs A and B do not directly communicate. To ensure that tasks are processed sequentially according to a predetermined workflow, a status field 170 of an object may be updated when each program is successfully completed on the object. Instead of updating the status field 170 to record the successful completion of program A 111 on an object with the exemplary status "Program A Done", the core system may modified to record the successful completion of Program A 111 on the object with a partial completion status, such as "Program A Action Issued" 191. In some instances, this may be the only modification to the core system 160 necessary to use the claimed invention. By minimizing the modifications to the core system 160, modifications, upgrades, and additions to the core system 160 may be more readily and efficiently integrated.

A separate status/action management system 190 may also be included in an embodiment. The action management system 190 may include functionality to check on the status of object and perform additional processing on objects depending on the current status of the object. For example, the action management system 190 may use push or pull technologies, such as HTTP server pushes, Java® pushlets, and RSS feeds, to check for status field updates.

Objects with different statuses may cause different processes to be performed. For example, once the action management system 190 becomes aware that an objects has the modified program A completion status "Program A Action Issued" 190, the action management system 190 may initiate a series of additional processes, shown as extension steps 1 to N 192. Once these additional extensions steps 1 to N 192 have been successfully completed, the action management system 190 may change the status field of the object back to the original completion status "Program A Done" 170 so that the next program B 111 in the workflow, which may only initiate for objects with the original completion status "Program A Done" 170, may begin. Although the status field may be updated with a variety of status indicators, using the original status indicator triggering the next program in the core system 160 workflow eliminates the need to reconfigure the next program in the workflow to respond to a revised status indicator.

Figure 2:
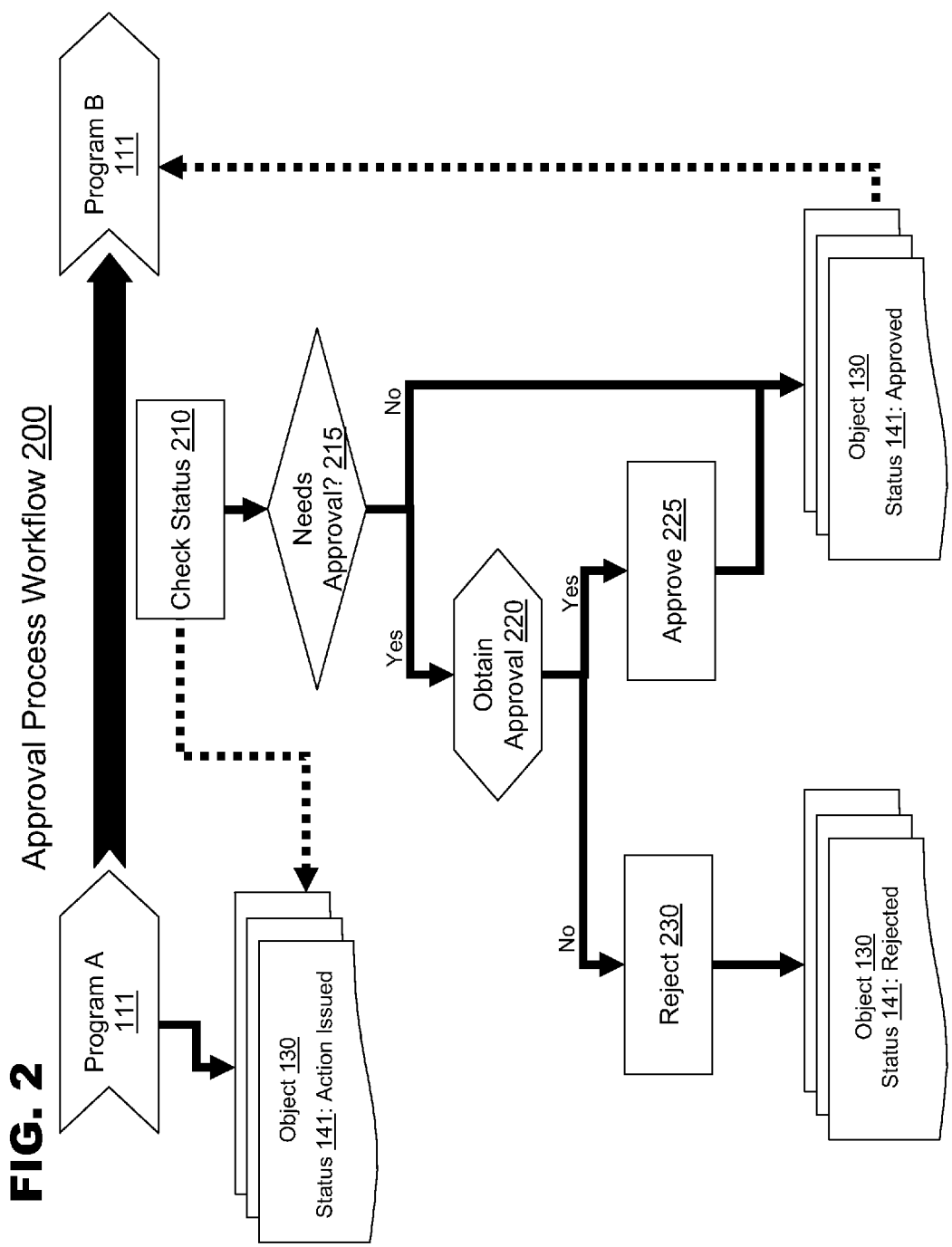
FIG. 2 shows exemplary approval process workflow in an embodiment.

In some embodiments, the action management system may include an approval process to determine when an object's status should reflect full completion of a program to enable a subsequence program in a workflow to commence. FIG. 2 shows exemplary approval process workflow in an embodiment. In this embodiment, when program A 111 in the core system 160 has finished performing its processes on object 130, it may send a partial completion "Action Issued" status to be stored in status field 141 of object 130 in a database.

In box 210, an action management system 190 may synchronously or asynchronously check for updated status field in the database or receive updated status field information from the database.

After checking the status fields in the database for objects with a partial completion status, in box 215 the system may determine whether the object needs further approval before the next program may commence. This determination may be through a programming logic specifying conditions requiring further approval, such as a request for expenditures over $X require approval. Other forms of programming logic, such as, a lookup table may be used to match objects, programs, and/or other approval criteria to determine whether additional approval is needed.

If no further approval is necessary, the status field 141 of the object 130 in the database may be updated to indicate that the object has been approved and/or approval is not necessary for the next program, program B 111, in the sequence to commence.

If, however, additional approval is necessary, in box 220, the system may follow a set of preprogrammed process steps to obtain the necessary approval. For example, if the approval process requires obtaining a permit, license, or other form of regulatory or supervisory approval, the system may electronically: extract the data required to obtain the approval from the organization's computing systems and/or databases, structure the data in a format recognized by the third party approver, send the structured data to the third party approver, and process a received decision of the third party approver.

If the processed decision indicates that the request for approval has been rejected, then in box 230, the action management system 190 may instructions to the database to update the status field 141 of the object 130 to rejected. If the processed decision indicates that the request has been approved, then in box 225 the action management system 190 may instruct the database to update the status field 141 of the object 130 to indicate approval. Instead of merely recording approval or rejection, the action management system 190 may also be configured to store additional data received from a third party approver in the database or other organizational computing system. For example, if the third party approver send an approval number, confirmation code, or license number, instead of or in addition to an express approval, the action management system 190 may be configured to extract this information from the response and update the organization's computing systems with the information.

Figure 3:
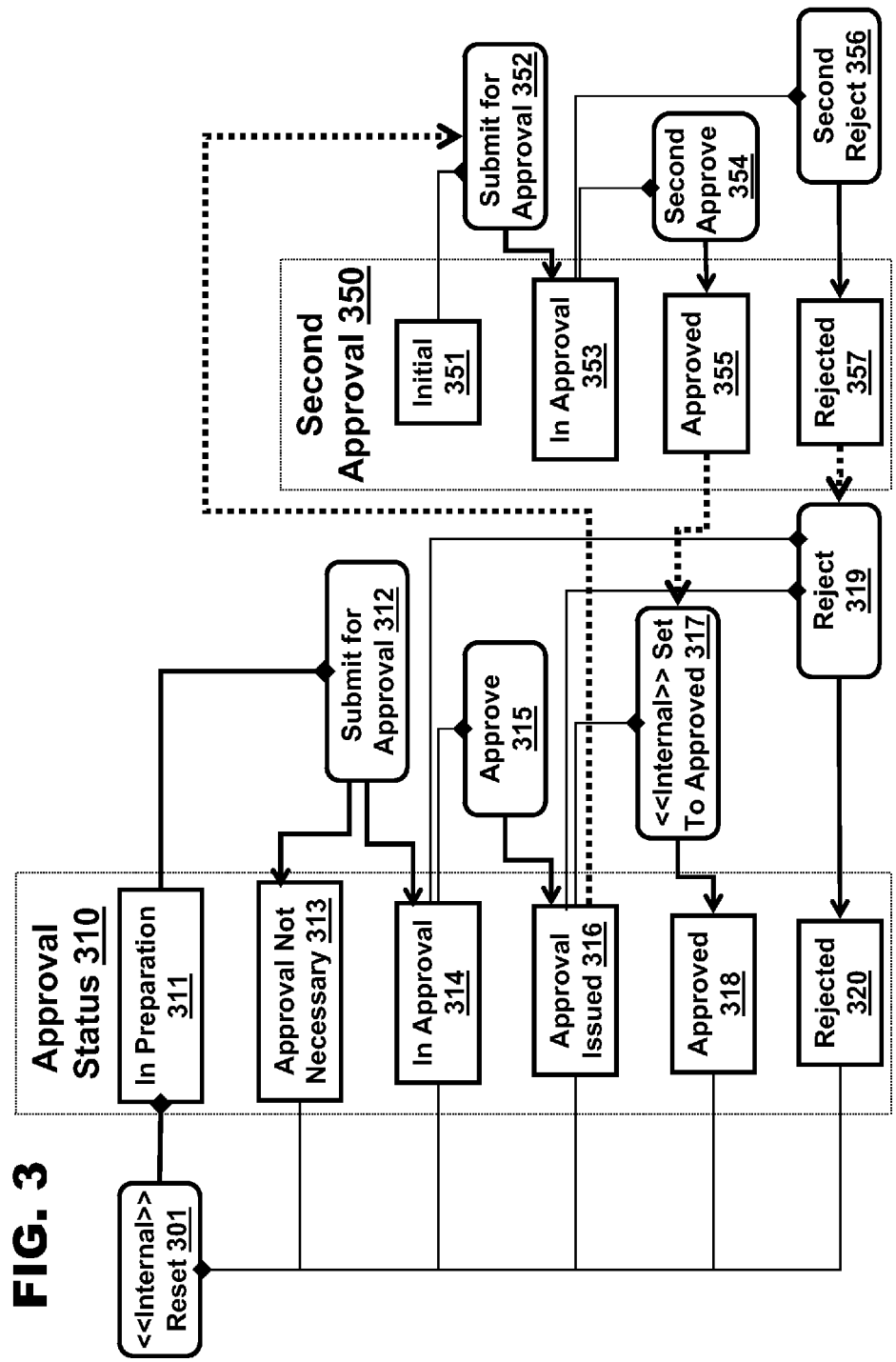
FIG. 3 shows exemplary status changes in a hierarchical approval process workflow.

FIG. 3 shows exemplary status changes in a hierarchical approval process workflow of an embodiment including first and second level approval fields 310 and 350, respectively. In box 301, the approval process system may be reset. The approval status field 310 may be initially set in preparation 311, as preliminary steps of a program are executed. Once steps in the process requiring approval have been reached, an approval request may be submitted for approval.

After submission, the approval request may be electronically processed, and a decision may be made through a lookup table and/or other processing logic whether additional approval is necessary. If no additional approval is necessary, the status field 310 may be updated to indicate Approval Not Necessary 313 and the approval process may terminate. If additional approval is necessary, the approval request may be forwarded to the appropriate approval authority, which may be determined through the aforementioned processing logic. The status field 310 may be updated to indicate that the approval is underway 314.

If the first approval authority approves 315 the request, in box 316 the approval may be recorded in the status field of the object in the database. The aforementioned processing logic may be used to determine whether additional approval is necessary. If additional approval is needed, then in box 352, a request for additional approval may be sent to the designated secondary approval authority. The second approval status field 350 may be changed from an initial value 351 to reflect the in approval 353 status. Once the secondary approver approves the request 354, the status may be updated to approved 355, which may result in the processing logic 317 to update the status of the approval field 310 to approved 318.

If the secondary approver rejects 356 the request, then the second approval status field 350 may be changed to rejected. A rejection process 319 may update the status 310 to rejected 320 when either the second approval status field is rejected or the first approver rejects the request.

Figure 4:
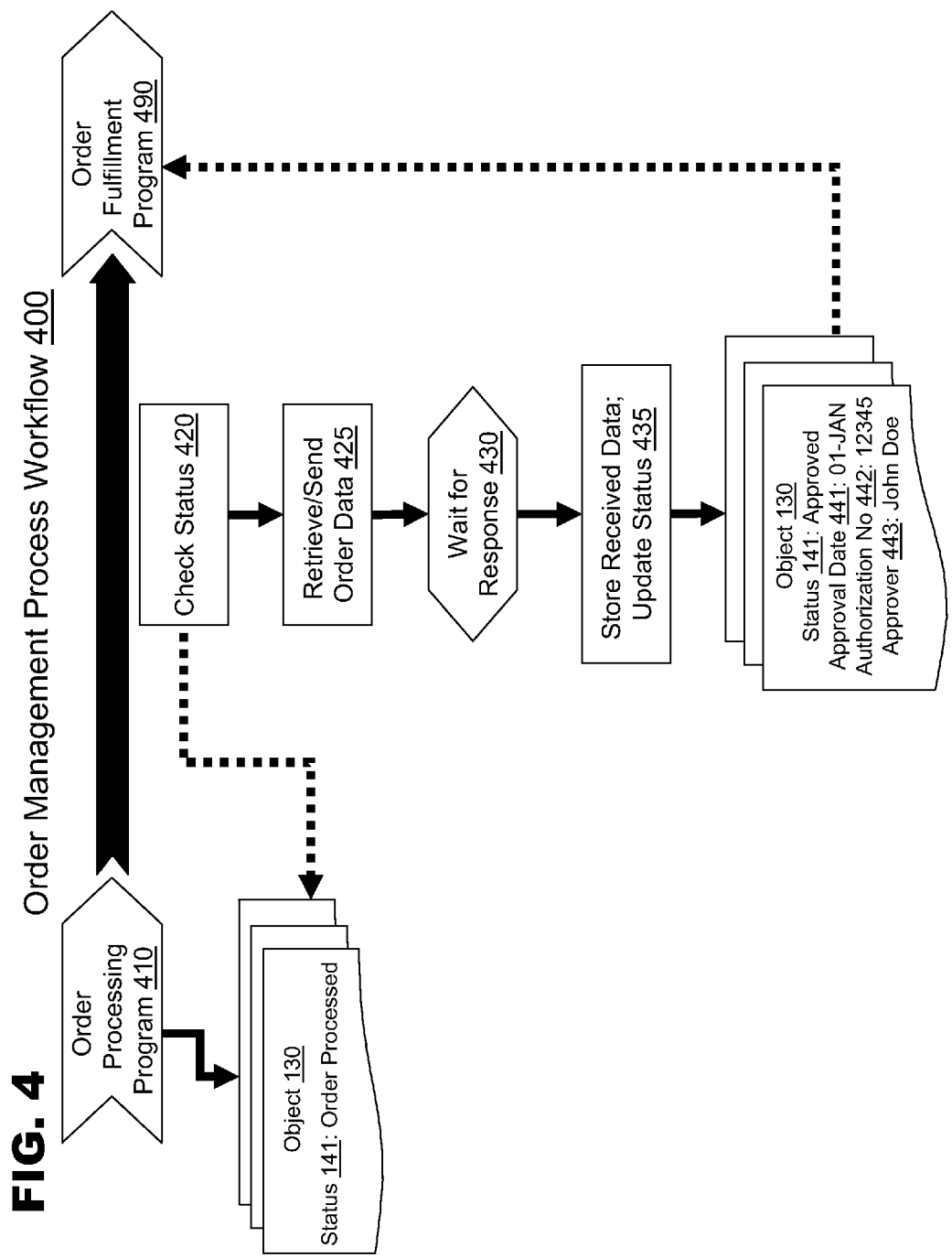
FIG. 4 shows an exemplary embodiment of the invention in a order management process workflow.

FIG. 4 shows an exemplary embodiment of the invention in an order management process workflow 400. In this embodiment, once an order processing program 410 has finished processing an electronic order for goods or services, the program 410 may send instructions to a database to update the status field 141 of the corresponding order object 130 to a partially complete status, such as order processed.

In box 420, the action management system 190 may periodically check the status field 141 of objects 130 in the database. When the action management system 190 identifies objects with status fields 141 indicating order processed, the action management system 190 may retrieve data relating to the order from the organization's computing systems, restructure the information into a third-party compatible format, and send the data to the third party for further processing 425.

For example, the action management system may extract credit card information and billing information, restructure the information into format required by a credit card processor, and send the information to the credit card processor. Alternatively, the action management system may extract order information, restructure the order information in a format required by a regulatory authority, and send the information to the regulatory authority to obtain a license, permit, or other authorization.

The system may wait 430 for a response from the entity to whom the extracted data was sent. Once a response is received, data included by the entity in the response may be stored in an organization's computing systems and the status of the object in the database may also be updated 435. For example, if a processed order was sent to a third party for approval, the third party may send back an authorization number 442, in this case 12345, and a name of a person approving the order 443, in this case John Doe. This information, along with the date 441 the approval was received may also be stored in corresponding fields of the object 130 in the database. Additionally, the status field 141 of the object 130 may also be updated to indicate that the order was approved.

Once the status field 141 of the object 130 indicates that the order has been approved, the logic in the workflow 400 may enable the order fulfillment program 490 to commence in order to begin preparing and shipping the order to the customer.

Figure 5:
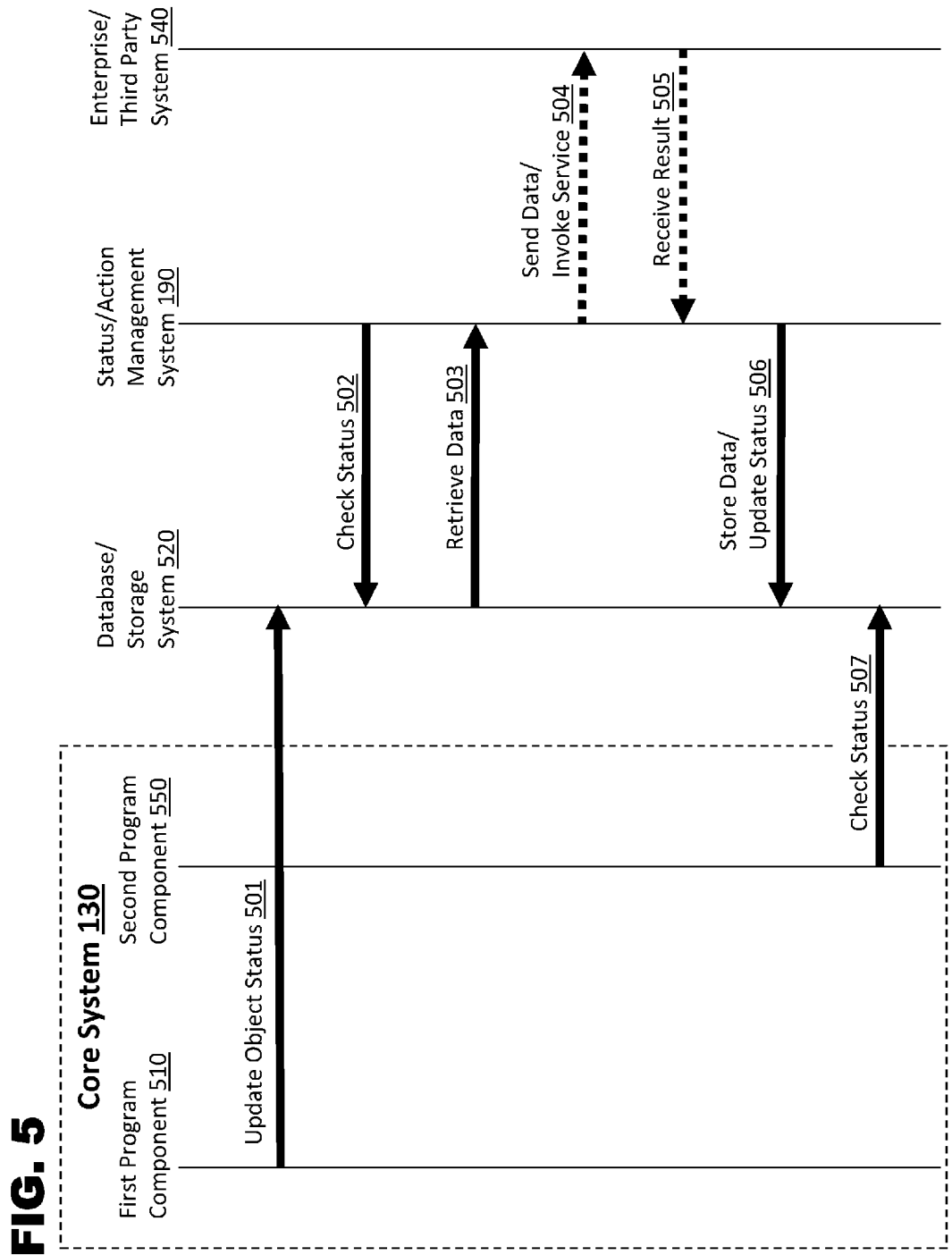
FIG. 5 shows an exemplary flow of data between systems in an embodiment.

FIG. 5 shows an exemplary flow of data between systems in an embodiment. A core system 160 may include two or more program components, including first and second components 510 and 520. Each of the program components may be independent of each other and may not directly communicate with each other.

The first program component may send an update status of an object 501 to a database system 520 when the first program component successfully processes the object. An action management system 190 may periodically check or receives status updates 502 from the database system 520. When the action management system 190 identifies objects with a status indicating that the first program component 510 has successfully completed, the action management may retrieve data 503 related to the first program component 510 from the database system 520.

In some embodiments where the action management system 190 is configured to interact with third party systems, the action management system 190 may reformat the data and send the data 504 to a third party system 540. The third party system may invoke a service to further process the data sent from the action management system 190. Once the third party system 540 has finished its processing on the data, it may send a result of the further processing to the action management system. The action management system may receive the result 505, and then send the result and a status update 506 based on the result to the database system 520 to be stored.

The action management system 190 may also perform other processing functions on objects and send updates to the database system 520 when the updates are complete.

The second program component 550 may periodically send update requests to or receive update requests from the database system 520 to determine whether the status of any objects have been updated by the action management system 190 to indicate successful completion of any processing functions on the object by the action management system 190. Once the second program component 550 identifies objects with a status indicating successful completion of processing functions, the second component 550 may begin executing its processing functions on the identified objects.

Figure 6:
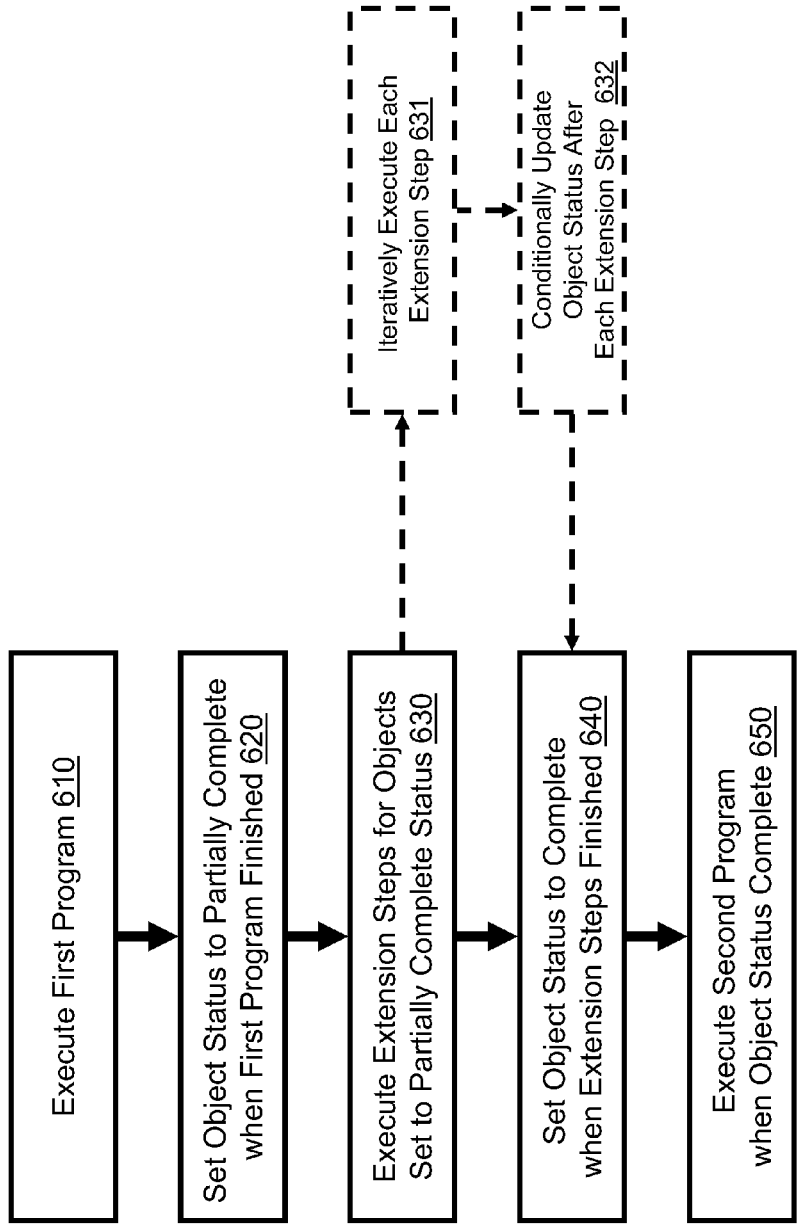
FIG. 6 shows an exemplary method in an embodiment.

FIG. 6 shows an exemplary method in an embodiment. In box 610, a first program in a core system may be executed.

The first program may apply processing functions to an object in order to complete a first task in a workflow involving the object.

In box 620, a status field of the object in a database may be set to partially complete when the first program is successfully completed.

In box 630, an action management system 190 may periodically check the status fields of object in the database and perform additional, user-customized processing functions on the objects with a partially complete status set by the first program.

In some embodiments, where the additional processing functions includes multiple extension steps, in box 631 the multiple extension step functions may be iteratively executed and in box 632 the status field of the object may be conditionally updated after each extension step is executed.

In box 640, the action management system 190 may set the object status to complete when the extension sets are finished.

In box 650, a second program in the core system may check on or receive updates of the status of objects in the database. The second program may apply its processing functions on objects having a complete status set by the action management system.

Figure 7:
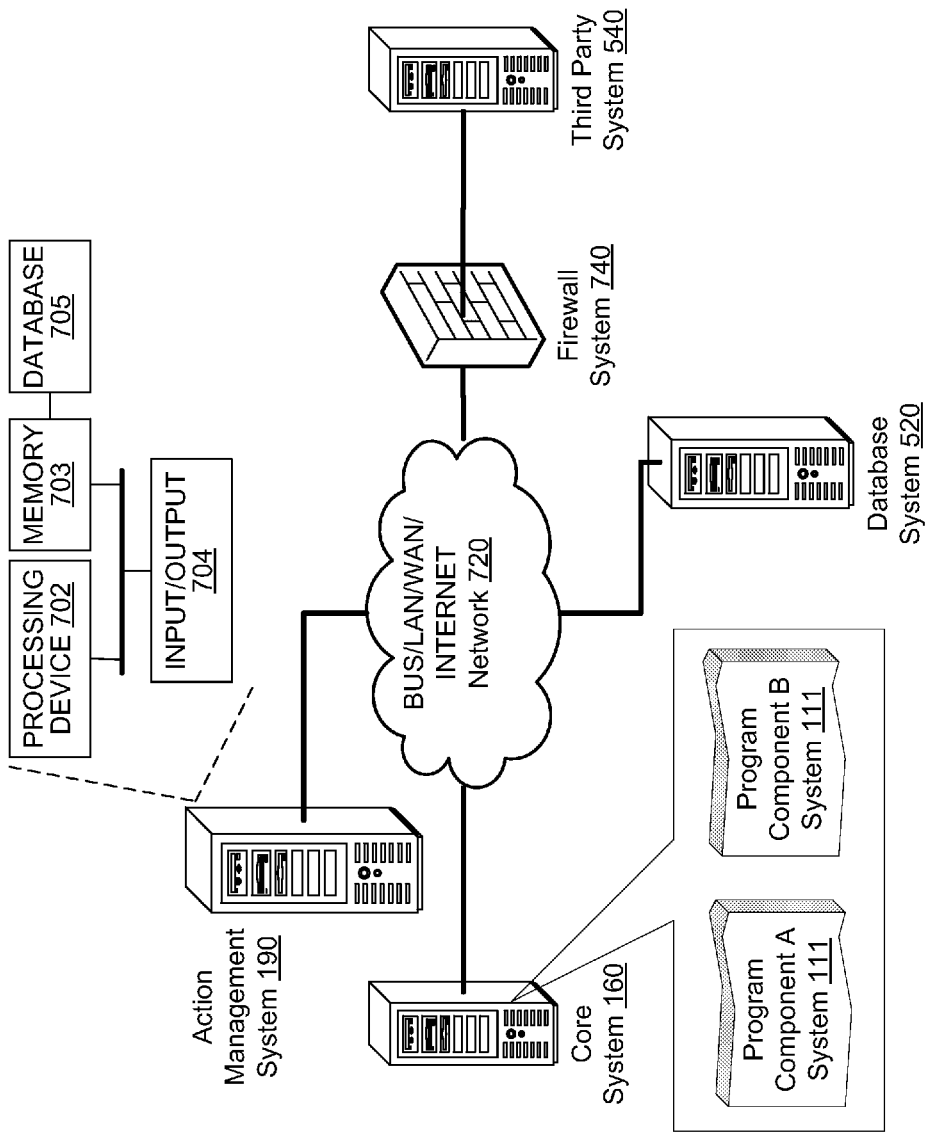
FIG. 7 shows an embodiment of systems coupled to each other through a network.

FIG. 7 shows an embodiment of an action management system 190 coupled to a core system 160, database system 520, and enterprise or third party system 540 through a network 750. In an embodiment, the core system 160 may include two or more programming components 111 (shown as program components A and B). Each of the program components may be on separate, independent computing systems forming a core system, or the components 111 may be consolidated or integrated into a single core system 160.

The third party system 540 may be connected to a firewall system 740 that may prevent the third party system 540 from directly accessing other systems of the organization, including the action management system 190, core system 160, and database system 520. If the third party system 540 is under the control of the organization or is managed by a trusted third party, then it may bypass the firewall system 740 so that it may directly access the other systems of the organization.

Each of the systems in FIG. 7 may contain a processing device 702, memory 703 containing a database 705, and an input/output interface 704, all of which may be interconnected via a system bus. In various embodiments, each of the systems 190, 160, 740, 540, 111, and 520 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 803 may contain different components for retrieving, presenting, changing, and saving data. Memory 803 may include a variety of memory devices, for example, Dynamic Random Access Memory (DRAM), Static RAM (SRAM), flash memory, cache memory, and other memory devices. Additionally, for example, memory 803 and processing device(s) 802 may be distributed across several different computers that collectively comprise a system.

Processing device 802 may perform computation and control functions of a system and comprises a suitable central processing unit (CPU). Processing device 802 may comprise a single integrated circuit, such as a microprocessing device, or may comprise any suitable number of integrated circuit devices and/or circuit boards working in cooperation to accomplish the functions of a processing device. Processing device 802 may execute computer programs, such as object-oriented computer programs, within memory 803.

Figure 8:
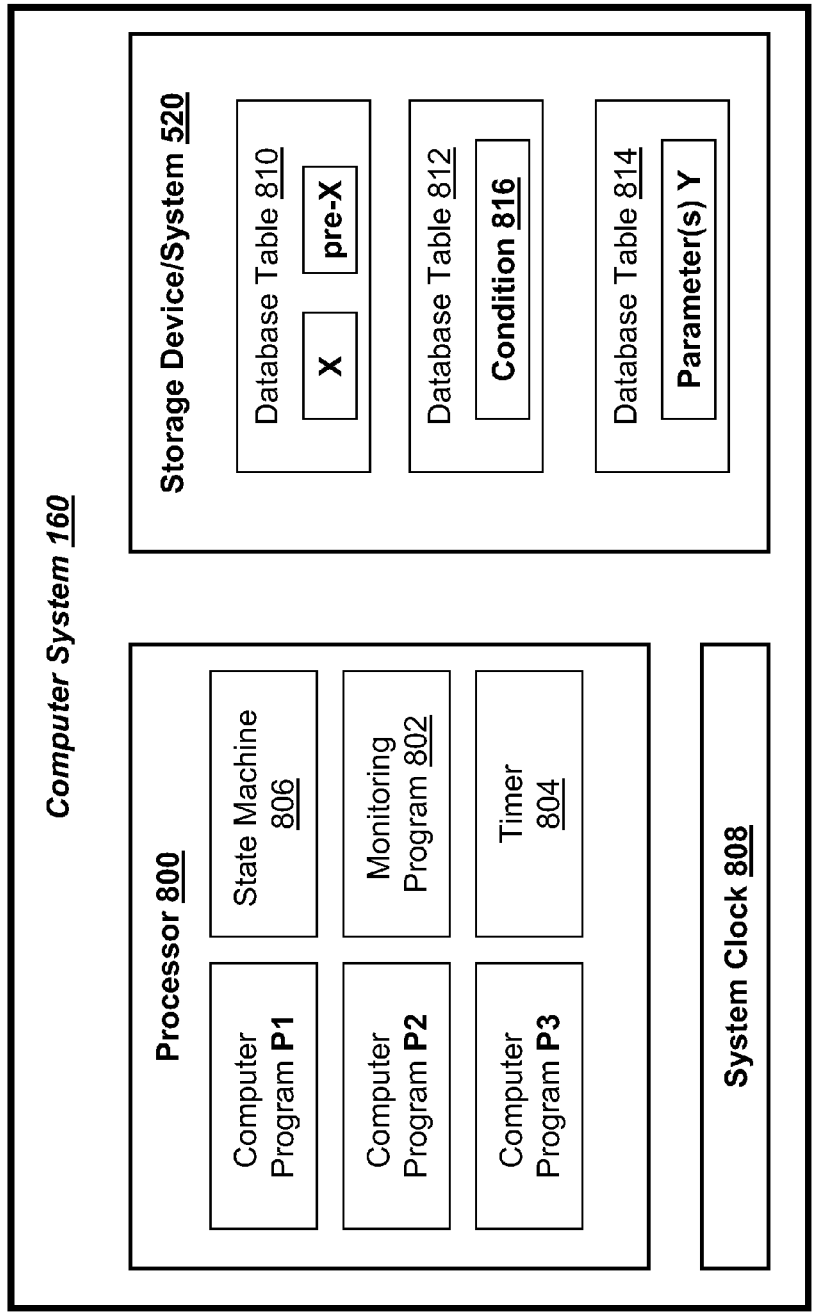
FIG. 8 shows a block diagram of an embodiment of a computer system.

FIG. 8 shows a block diagram of components that may be included in a computer system analogous to the core systems 130 and/or 160 shown in FIGS. 5 and/or 7. The computer system 160 may include a storage device that may be part of a database/storage system 520 analogous to that shown in FIGS. 5 and/or 7.

Computer system 160 may include at least one microprocessor 800 executing the computer programs P1, P2, P3, a monitoring program 802, a timer 804 and a state machine 806.

In some embodiments, computer program P1 may be analogous to program A, computer program P2 may be analogous to program B, and computer program P3 may be analogous to extension steps 1 to N of other embodiments described in this application.

Further, the computer system 160 may have a system clock 808 that provides a time reference for the timer 804.

The storage system 520 may store a database that includes various database tables such as database tables 810, 812 and 814.

Database table 810 may store a status X indicating a completion of the execution of program P1, and program P3 if the execution of program P3 is also required. Storage of the status X in database table 810 may be a necessary precondition before computer program P2 may be executed. However, in some instances, the status 'preX' may need to be set in the database table 810 before the status X can be set.

If conditional execution of an extension provided by the computer program P3 is desired, a respective condition 816 may need to be stored in the database table 812. The condition 816 may have the form of a Boolean term and may require one or more input parameters for evaluation of the condition 816. Evaluation of the condition 816 may return the value 'true' or 'false' depending on the value of the one or more parameters, such as a parameter Y stored in table 814.

Database table 814 may store parameter values that may be required for evaluation of the condition 816, such as the parameter value for Y.

During operation the computer system 160 may perform a method that may include five sub-processes as explained below and shown in FIG. 9.

The first sub-process may include boxes 900 to 904. In box 900, the program P1 may be started. After starting the program P1, in box 902 a computational task may be executed. Once the program P1 has finished executing, in box 904 a request may be generated for setting the status X indicating that the execution of the computational task has been completed. This request may be sent from the program P1 to the state machine 806 which triggers the second sub-process.

The second sub-process may include boxes 906 to 924. In box 906, the state machine may perform a write access to the database table 810 in order to write the status preX rather than the status X into the database table 810. In box 908, the database access may be performed by the state machine 806 in order to attempt to fetch a condition that is assigned to the task that has been executed in the first sub-process. In box 910, a determination may be made as to whether the database access fetch attempt in box 908 returned a condition or not. If no condition is returned, no extension steps may be required and the status X may be set in box 912 by performing a respective database write operation by the state machine 806.

If a condition is returned, the timer 808 may be started in box 914. In box 916, a database access for reading the parameter values (such as the parameter value of Y) that are required for evaluating the condition fetched in box 908 may be performed. In box 918, the condition may be evaluated using at least the parameter value that has been read in box 916. In box 920 a determination may be made as to whether the evaluation of the condition has returned 'true'. If the evaluation has returned 'true', then the condition may be already fulfilled without requiring performance of an extension step. As a result, in box 922 the timer may be reset and the method may return to box 912 to set the status X.

If the determination in box 920 indicated that the evaluation returned 'false', the third process may be called in box 924 and after completion, the method may return to box 916.

The third sub-process may include boxes 926 to 930. In box 926, program P3 may be started. During execution of the program P3, in box 928, the value of parameter Y and/or other parameters may be modified. In box 930, a database access may be performed to database table 814 in order to write the modified parameter value(s).

The repeated execution of the loop formed by boxes 916, 918, 920 and 924 in the second process may be terminated if the evaluation of the condition in box 918 returns 'true', which may be due to a modification occurring during execution of the third sub-process in boxes 926 to 930.

In order to prevent an endless loop of boxes 916, 918, 920 and 924 in the second process, a fourth sub-process may be invoked in box 914 of the second sub-process when the timer 804 is started. The fourth sub-process may include boxes 932 to 936. In box 932, the timer value may be read. In box 934, a determination may be made as to whether the timer value is above a predefined threshold value.

If the timer value is not above the predefined threshold value, the method may return to box 932. Otherwise, if the timer value is above the predefined threshold value, in box 936 a signal may be generated that indicates a time-out. This signal may be displayed on a computer monitor in order to inform an operator that corrective action may be necessary. The operator may then take corrective action.

The fifth sub-process may include boxes 938 to 944. The fifth sub-process may be loosely coupled to the first process via the status X that may or may not be stored in the database table 810. In box 938 a read access to the database table 810 may be performed in order to determine in box 940 whether the status X has been set or not.

If the status X has been set, the program P2 may be started in box 942 and a further computational task may be thereafter executed in box 944. If the status X has not been set, the method may return to box 938.

Figure 9:
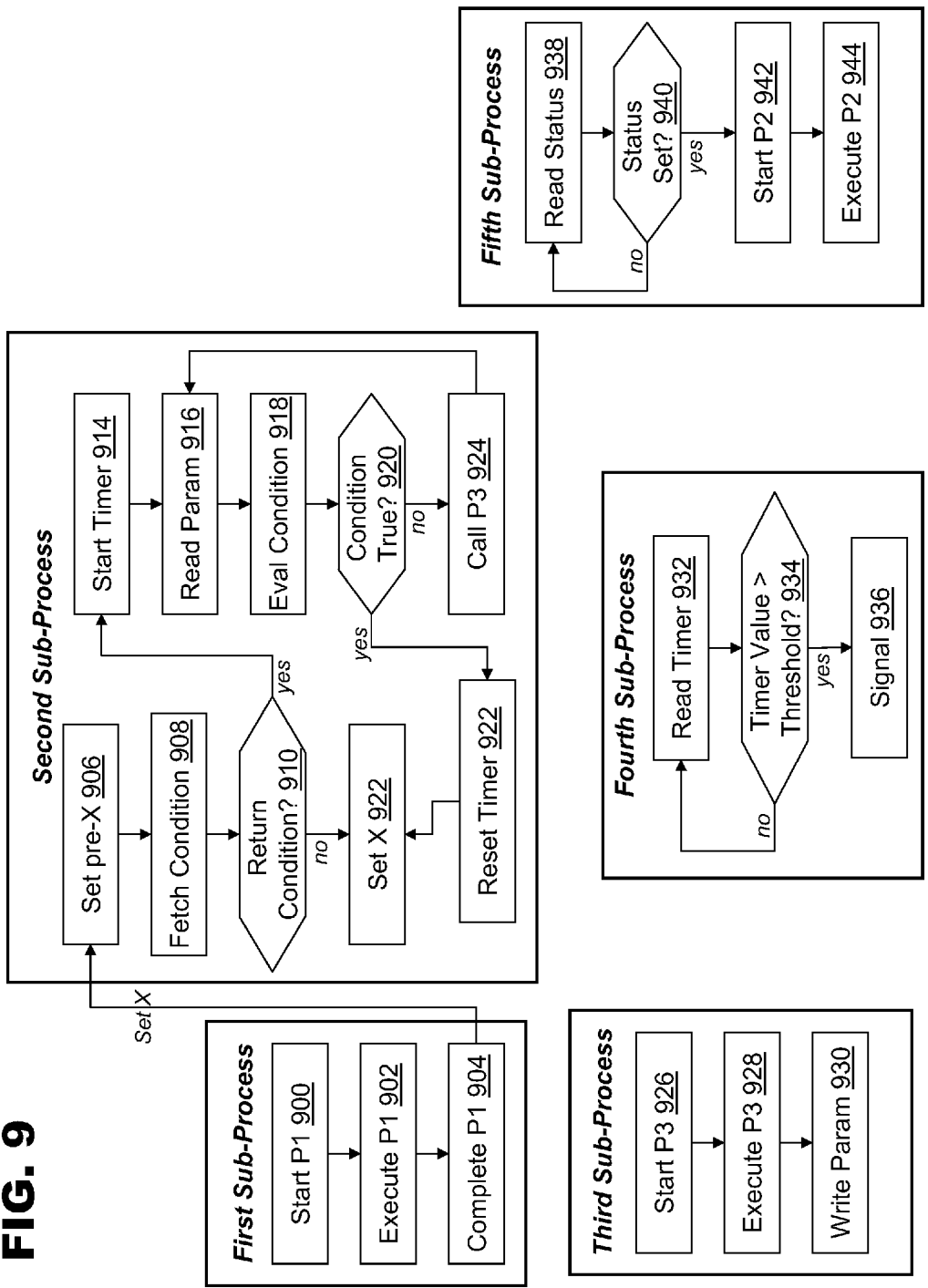
FIG. 9 shows a flowchart of processes that may be performed by the computer system shown in FIG. 8.
Figure 10:
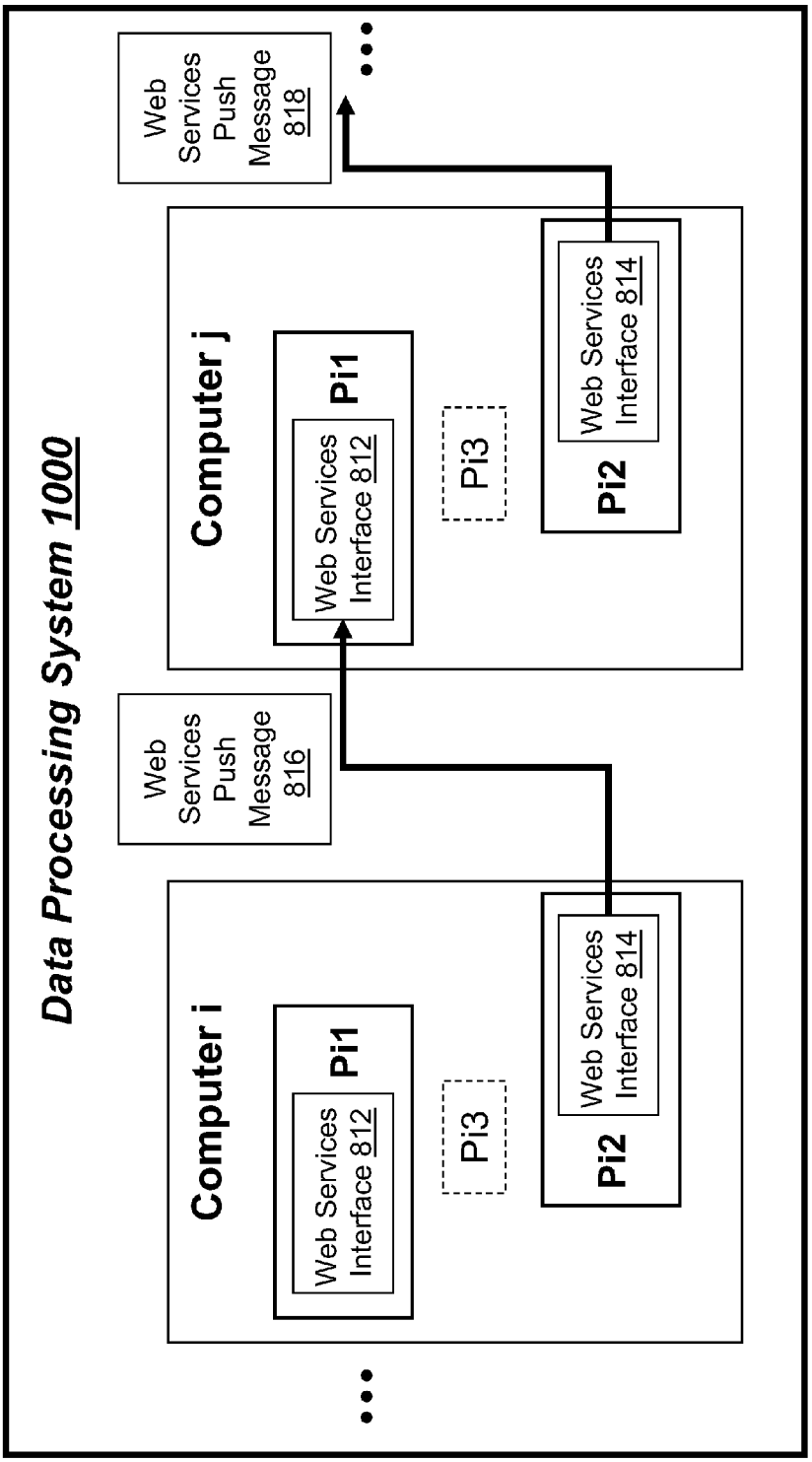
FIG. 10 shows a block diagram of a data processing system that includes multiple cascaded computer systems of the type shown in FIG. 8.

FIG. 10 shows a data processing system 1000 that includes multiple cascaded computer systems, including computer systems i and j, that may, but need not be, similar to computer system 860 shown in FIGS. 8 and 9. Computer i may include computer program Pi1 that corresponds to the computer program P1, computer program Pi2 that corresponds to P2, and computer program Pi3 that corresponds to computer program P3. The same may also apply analogously to computer j and the other computers not explicitly shown in FIG. 10 that constitute the data processing system 1000. Computer programs Pi1, Pi2, Pj1, Pj2, and the corresponding computer programs of the other computers of the cascade may each have respective web services interfaces 812 and 814. The web services interface 814 of a preceding one of the computers of the cascade may be coupled to a web services interface 812 of the next consecutive computer system thereby forming the cascaded arrangement of the computers, as shown in FIG. 10 with respect to the computers i and j.

After completing the further computational task, program Pi2 may send a web services push message 816 with an input value to the next element of the cascade, such as the web services interface 812 of program Pj1 of the next element in the cascade. This may trigger execution of Pj1, such as in box 900 of FIG. 9. Likewise execution of the further computational task by the program Pj2 may result in the sending of another push message 818 to the following element in the cascade.

The type of computational tasks that may be performed by various computer programs of different computers in the cascade may vary from computer to computer in order to support the implementation of complex data processing operation involving multiple computational tasks. For example, in one embodiment, at least one element in the cascade may implement an extension step for error checking and/or error correction through the use of an error correcting code.

The cascaded arrangement of multiple computers shown in FIG. 10 may remain operational even if there should be a single point of failure. If one of the computer systems becomes defective it can be replaced by an equivalent replacement computer system without necessarily interrupting overall operation of the data processing system as the push messages propagate through the cascade.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, hard disks, floppy disks, or CD ROM; the Internet or other propagation medium; or other forms of RAM or ROM.

We claim:
1. A computer-implemented method including:
 a first sub-process comprising:
  executing a first program for performing a computational task,
  upon completion of the execution of the computational task, generating a request to set a status indicating completion of the computational task by the first program, and
  sending the request from the first program to a state machine;
 a second sub-process comprising:
  receiving the request from the first program by the state machine,
  responsive to receiving the request from the first program, performing a write database access for writing a precursor of the status into a first database table by the state machine, the precursor of the status indicating completion of the computational task,
  performing a database query to fetch a condition being assigned to the computational task from a second database table by the state machine,
  determining whether the database query returned the condition,
  if the database query returned the condition, then:
   starting a timer, performing a database access for reading at least one parameter value from a third database table, evaluating the condition using the read at least one parameter value to determine whether the condition is true or not true, if the condition is true performing a write database access in order to write the status into the first database table and resetting the timer, the status indicating completion of the computational task, if the condition is not true, invoking a third sub-process and reperforming the database access for reading the at least one parameter value, and the evaluation of the condition using the read at least one parameter value, and if the database query did not return the condition, performing a write database access in order to write the status into the first database table, the status indicating completion of the computational task;

the third sub-process comprising:

executing a third program for performing an additional computational task, the additional computational task resulting in a modification of at least one parameter value stored in the third database table, and performing a write database access by the third program for writing the at least one modified parameter value to the third database table;

a fourth sub-process comprising:

repetitively reading the timer value of the timer by a monitoring program component, and when the timer value has reached or is above a pre-defined threshold value, generating a signal to prevent an endless loop in the second sub-process by the monitoring program component; and a fifth sub-process comprising:

repetitively performing a read operation to the first database table for determining whether the status has been set to indicate the completion of the computational task, and when the status has been set to indicate the completion of the computational task, executing a second program for performing a further computational task.

2. The computer-implemented method of claim 1, further comprising:

consecutively executing the method of claim 1 multiple times at cascaded computers;

adapting a first program of a first computer in the cascade to receive a web services push message from a second program of a second computer in the cascade preceding the first computer; and starting the execution of the first program component for performing the computational task responsive to receiving the web services push message.

3. The computer implemented method of claim 2, wherein the additional computational task executed by the third program includes an error correction operation.

4. The computer implemented method of claim 1, wherein the request comprises requesting a first update of a status field of an object, the computational task being executed in a first phase, and the precursor of the status indicating completion of the first phase, the further computational task being executed in a second phase, and the method further comprises:

transmitting over a communications network a first update of a status field of an object to the first database, the update indicating completion of a first phase of a first program component in a first computing system;

identifying, through a processing device, an object in the first database having its status field indicate completion of the first phase;

performing a processing function at a second computing system on the identified object, the processing function varying depending on the object, and the first and second computing systems communicatively independent of each other;

transmitting over the communications network a second update of the status field indicating completion of the second phase of the first program component to the first database; and initiating a second program component in the first computing system on an object in the first database having its status field report completion of the second phase, the second program component communicatively independent of the first program component and the second computing system.

5. The computer implemented method of claim 4, wherein the first phase represents a partial completion of the first program component.

6. The computer implemented method of claim 4, wherein the second phase represents total completion of the first program component.

7. The computer implemented method of claim 4, wherein the processing function includes approving an activity performed during execution of the first program component.

8. The computer implemented method of claim 7, the processing function further comprising:

determining, through user-supplied processing logic, whether further approval for the activity is necessary;

submitting an approval request for the activity to an entity according to the processing logic when approval is necessary, otherwise, updating the status field of the object to indicate no approval needed; and after electronically receiving an answer to the approval request from the entity, updating the status field to reflect the answer.

9. The computer implemented method of claim 8, the processing function further comprising:

if the answer indicates that the approval request has been approved, determining, through user-supplied processing logic, whether additional approval is needed;

when additional approval is needed, iteratively submitting additional approval requests to entities in a hierarchical order after receiving approvals from subordinate entities;

updating the status field to reflect rejection after receiving a first rejection; and otherwise updating the status field to reflect approval after receiving approvals from each entity in the hierarchy.

10. The computer implemented method of claim 9, wherein the user-supplied processing logic includes use of a lookup table.

11. The computer implemented method of claim 7, the processing function further comprising:

extracting data relating to the activity;

restructuring the data into a format compatible with a third party computing system;

sending the extracted data to the third party computing system to obtain a result of further processing of the extracted data; and after receiving the result from the third part computing system, storing the result in another computing system.

12. The computer implemented method of claim 11, further comprising transmitting a status update dependent on the result to the database.

13. The computer implemented method of claim 7, wherein the first and the second computing systems are connected to a same network.

14. The computer implemented method of claim 7, wherein the first computing system is a core system and the second computing system is an action management system.

15. The computer implemented method of claim 7, wherein the first computing system collectively includes separate computing systems for each program component.

16. A computer system comprising:
a first program;
a second program;
a third program;
a state machine;
a monitoring program component;
a system clock;
a timer using the system clock;
a storage device for storing a database; and
a processor for accessing the database and executing the first program, the second program, the third program, the state machine, the monitoring program component, and the timer, the processor being operable to perform the method of claim 1.

17. The computer system of claim 16, further comprising:
a core system transmitting over a communications network a first update of a status field of an object to the storage device storing the object, the first update indicating completion of a first phase of the first program, the core system initiating the second program on an object in the database having its status field indicate completion of a second phase of the first program, the second program communicatively independent of the first program; and
an action management system executing a processing function on an object in the database system having its status field indicate completion of the first phase and transmitting over the communications network a second update of the status field indicating completion of the second phase of the first program to the database system, the processing function varying depending on the object, the core system and the action management system communicatively independent of each other.

18. The computer system of claim 17, wherein the action management system:
extracts data relating to the object and the first program,
restructures the data into a format compatible with a third party computing system,
transmits the extracted data to the third party computing system over the communications network to obtain a result of further processing of the extracted data, and
after receiving the result from the third part computing system, stores the result, wherein at least one of the systems is connected to the communications network through a firewall system and wherein an upgrade to one of the action management system and the core system is performed without having to modify the other system.

19. The computer system of claim 16, wherein:
the computer system is part of a data processing system comprising multiple cascaded computer systems,
the first program of a first computer in the cascaded systems is adapted to receive a web services push message from a second program of a second computer in the cascaded system preceding the first computer, and
the first program is further adapted to start execution of the first program responsive to receiving the web services push message.

20. A non-transitory computer readable medium comprising stored instructions that, when executed by a processing device, cause the processing device to perform the method of claim 1.

* * * * *